NON-LINEAR MATHEMATICAL SIGNAL CONDITIONING SYSTEM

Filed Sept. 7, 1967

INVENTORS
BERNARD M. GORDON
LEOPOLD NEUMANN
BY
Robert J. Schiller
ATTORNEYS

United States Patent Office 3,548,323
Patented Dec. 15, 1970

3,548,323
NON-LINEAR MATHEMATICAL SIGNAL CONDITIONING SYSTEM

Bernard M. Gordon, Magnolia, and Leopold Neumann, Lexington, Mass., assignors to Gordon Engineering Company, Waltham, Mass., a limited partnership of Massachusetts Filed Sept. 7, 1967, Ser. No. 666,186
Int. Cl. G06g *7/12;* H03b *1/00;* H03k *5/00*
U.S. Cl. 328—142 7 Claims

ABSTRACT OF THE DISCLOSURE

A signal conditioning system having a unity gain transmission link including a pre-conditioning circuit formed of an operational amplifier having a non-linear gain dependent on the instantaneous amplitude of input signals, and a post-conditioning circuit formed as another operational amplifier having an non-linear transfer characteristic which is the inverse of the first amplifier.

This invention relates to electrical signal conditioning systems, and more particularly for conditioning systems for enhancing the dynamic range of a signal transmission network and for suppressing noise external to the signals being transmitted.

In various signal transmission equipment there are practical inhibiting limitations on the dynamic range of the systems (i.e. the ratio of maximum transferable signal to the minimum transferable signal) and to the lower limit to which noise in the system can be reduced. For example, in an AM radio transmission system, the maximum transferable signal level is limited by the power handling capability of the system, and the lower level is effectively limited by the noise generated or picked up. In a magnetic tape recording system (in which the tape and the recording and playback circuitry all constitute a transmission system) the maximum level that can be recorded is controlled by the saturation characteristics of the magnetic material of the tape, and the lower limitation is established by the noise or "hiss" level due to the randomness of magnetic domains of the material. Thus, many transmission systems, including recording systems, are limited by the value of the dynamic range rather than by the inherent degree of resolution which the systems possess. Improvement in the dynamic range, particularly by minimization of the effect of noise, then allows one to take better advantage of the resolution capabilities of the system.

A specific example of the problem imposed by limited dynamic ranges can be seen by reference to magnetic tape recording systems. Presently, the dynamic range of magnetic tape recorder-playback systems is limited to about 45 db, or not quite 200 to 1. That this is the present state of the art can be demonstrated by review of the specifications of the very best tape recording systems available today. Efforts have been made to improve the dynamic range of magnetic tape recorder-playback system, for example, by preemphasizing the lower level input signals relative to the higher input signals, and upon playback to deemphasize the lower level signals and emphasize the higher signals. However, preemphasizing and deemphasizing has been carried out typically by a voltage controlled attenuator, the controlled voltage being derived from an average level detection circuit in a manner similar to an AGC loop. This technique is frequency sensitive with a time of response related to the frequency spectrum, hence provides a response time or "pumping action" which results in undesirable audible effects. In an effort to circumvent these effects, there has been provided a system in which the audio spectrum of interest is divided into several sections or channels each with its own preemphasis and post-emphasis attenuators. But, the outputs necessarily must be mixed together and the result is that there are different time constants for the response to each different frequency group. The effect of a spectrum division system is further complicated in that the characteristic of each AGC loop depends to a large extent on the characteristics of individual semiconductors used, and the more complicated the system becomes, the more difficult proper matching of semiconductor characteristics becomes. Further, this prior art type of signal conditioner used in a single channel with a frequency crossover of 2500 cycles, results in no substantial improvement in the dynamic range provided for signals below about 2500 cycles.

A principal object of the present invention is to obtain significant improvement in the dynamic range of a signal transmission network over the entire frequency spectrum of interest transferable through such network. Other objects of the present invention are to provide a system for conditioning electrical signals passed through a transmission signal network so as to enhance the dynamic range of the network and suppress the effect of noise, all with low cost, and readily reproducible apparatus; to provide such a system for enhancing the dynamic range of a recorder-playback system; and to suppress the effect of noise generated within such recorder-playback systems.

To achieve the foregoing and other objects, the present invention involves non-linear pre-transmission signal conditioning and non-linear post-transmission signal conditioning, the non-linear transfer function of the post-transmission signal conditioning being the mathematical inverse of the non-linear transfer function of the pre-transmission signal conditioning.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein.

Figures 1, 2, 3, 4:
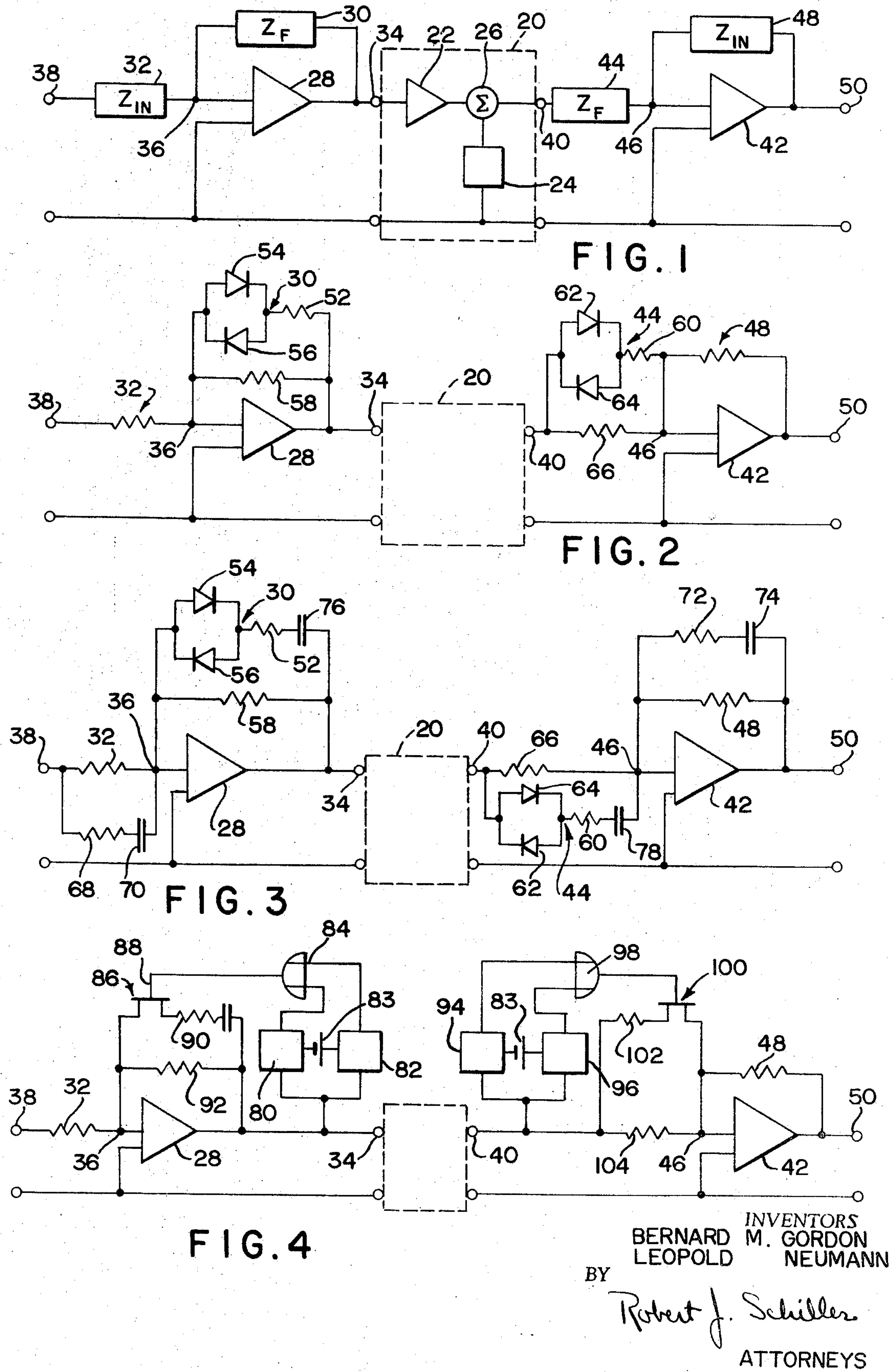
FIG. 1 is a schematic block diagram illustrating a system employing the principles of the present invention.
FIG. 2 is a more detailed circuit diagram, partly in block of a system incorporating the principles of the present invention.
FIG. 3 is alternative of the circuit of the invention particularly adapted to provide frequency responsiveness.
FIG. 4 is yet another alternative embodiment of the invention.

Referring now to FIG. 1 there is shown a general embodiment of the device comprising a signal transmission channel or link 20 shown generally by a dashed line block. The transmission channel characteristically has a linear transfer function and can be such diverse devices as simple wire, or more complex devices such as a recording-playback system, an AM radio transmission system or the like.

Link 20 is shown including an amplification stage amplifier 22 which has a net gain of unity. Also shown is a source 24 of noise which is summed with the output of amplifier 22 at summing junction 26. Obviously, link 20, as shown, is merely representative of a signal transmission network generally.

Input signals, prior to introduction into link 20, are preconditioned in a first circuit which will provide output signals variable as a non-linear function of the instantaneous amplitude of the input signals. To this end, the first circuit preferably comprises an operational amplifier including the usual high gain (ca.>1000) inverting, internal amplification stage 28, a negative feedback path including feedback impedance 30, and input impedance 32. The negative feedback path, of course, connects output terminal 34 of amplifier stage 28 to a summing junction 36 at the inverting input of stage 28. Input impedance 32 is connected between summing junction 36 and input terminal 38 at which an input signal $e_{in}$ is to be applied. Output terminal 34 is connected to a corresponding input terminal of link 20. The transfer function of the first circuit can be made non-linear with respect to the instantaneous value ($e_{in(t)}$) of the input signal, simply by providing either the feedback or input impedance or both as an impedance of the type which varies non-linearly as a function of voltage level.

As is well-known, the transfer function of an operational amplifier is directly given as the ratio of the values of feedback impedance to the input impedance, and is practically independent on the gain of the open loop amplifier. Thus, the output signal $e_{01}$ from the first circuit and thus introduced into link 20 can be expressed as (1)
$$e_{01}=\frac{Z_F}{Z_{in}}e_{in(t)}$$

where $Z_F$ and $Z_{in}$ are the values respectively of feedback impedances 30 and input impedance 32. Obviously, the transfer function of the first circuit then is simply the ratio of two values which are polynomials when $Z_F$ and $Z_{in}$ are complex impedances.

Output signals, $e_{02}$, from the transmission link are postconditioned in a second circuit which will provide further output signals $e_{03}$ variable, responsively to the instantaneous value of $e_{02}$ or $e_{02(t)}$, but with the inverse transfer function of that of the first circuit.

To this end then, a second circuit is provided having input terminal 40 connected to the corresponding output terminal of link 20, a high gain, inverting amplification stage 42, an input impedance 44 being connected between terminal 40 and summing junction 46 at the inverting input of stage 42. Feedback impedance 48 is connected between output terminal 50 of stage 42 and junction 46.

Because of the inverse relationship of the transfer functions of the first and second circuits, feedback impedance 48 can be considered as having the value $Z_{in}$ while input impedance 44 can be considered as having the value $Z_F$. The second circuit therefore provides output signal $e_{03}$ as follows:

(2)
$$e_{03}=\frac{Z_{in}}{Z_F}e_{02(t)}$$

Now, assuming for simplicity that link 20 has a constant transfer function of unity, the output and input signals of the link will be related as follows:

(3)
$$e_{03(t)}=e_{02(t)}+e_{n(t)}$$

where $e_{n(t)}$ is a time variable noise signal from source 24.

Hence, substituting, one obtains:

(4)
$$e_{03}=\frac{Z_{in}}{Z_F}(e_{01(t)}+e_{n(t)})$$

or (5)
$$e_{03}=\frac{Z_{in}}{Z_F}\left(e_{n(t)}+e_{in(t)}\frac{Z_F}{Z_{in}}\right)$$

which simplifies as (6)
$$e_{03}=e_{in(t)}+e_{n(t)}\frac{Z_{in}}{Z_F}$$

from which it is immediately apparent that the desired signal $e_{03}$ is a linear reproduction of $e_{in}$, but the noise signal $e_{n(t)}$ is non-linearly supressed when $Z_F>Z_{in}$. Both operational amplifiers are preferably and readily selected to have sufficient bandwidth to at least match the bandwidth of the transmission link. The operational amplifiers employed can be either DC or AC and need not be particularly precise provided that their transfer functions are inversely matched to one another over the frequency and amplitude ranges of interest.

Referring now to the devices shown in FIG. 2, wherein like numerals denote like parts, it will be seen that in the first circuit, the input impedance 32 is simply a resistor and feedback impedance 30 formed of a combination of resistor 52 in series with oppositely poled pairs of paralleled diodes 54 and 56, all in parallel with resistor 58. The output of the first circuit is connected to the input of link 20, the output of the latter being connected to the input of the second circuit. Input impedance 44 of the latter comprises another combination of resistor 60 in series with oppositely poled, paralleled diodes 62 and 64, all in parallel with resistor 66, and these circuit elements are selected so that the value of impedance 44 is substantially identical to the value of impedance 30. Similarly, feedback impedance 48 is simply a resistor of the same value as resistor 32.

The rectification equation for a PN junction barrier or metal-semiconductor barrier, in a diode in simplified form is (7)
$$I=I_0\ (e^{uV}-1)$$

where

I is the forward current through the barrier;
$I_0$ is the reverse saturation current of the diode;
$e$ is the natural base;
V is the voltage across the barrier; and
U is a constant which is about $1/_{26.5}$ mv. under room temperature conditions.

From Equation 7 one can calculate the resistance $R_{(v)}$ as (8)
$$R_{(v)}=\frac{dV}{dI}=\frac{e^{-uV}}{uI_0}$$

from which it can be seen that the larger the value of V the lower the impedance of $R_{(V)}$ becomes. This is characteristic of diodes 54, 56, 62, and 64. Regardless of the polarity of the input voltage $e_{in}$ applied at terminal 38, one of diodes 54 and 56 is back-biased and the other is in conduction. As the magnitude of $e_{in}$ rises, the value of impedance 30 then changes non-linearly.

Using exemplary circuit values for the embodiment of FIG. 2, the operation of the system will be more readily explained. For example, one can assume the following values:

$e_n$ in link 20—5 mv.
$e_{in}$—1 mv. to 1 v. (RMS)
resistors 32 and 48—10 KΩ each
resistors 58 and 66—100 KΩ each
resistors 52 and 60—7.5 KΩ each Thus $e_{in}$ represents about a 60 db range and the noise limits the dynamic range of link 20 to 46 db (to obtain a minimum signal to noise ratio of unity).

Due to the non-linearity of impedance 30, the higher the input voltages, the less is the closed loop in the first or preconditioning circuit. Typically, at low voltages (e.g. 10 mv.) the gain will be 10 and at higher voltages (e.g. 1 v.), the incremental gain is about 0.7. It will be appreciated that the noise $e_n$ can simply be considered as being summed with $e_{01}$, and then put through the second circuit which performs the inverse of the transfer function of the first circuit. It will be apparent that an input signal $e_{02}$ of 10 mv. to the second circuit as a consequence of an $e_{in}$ of 1 mv., will result in an output signal $e_{03}$ of 1 mv. However, the 5 mv. of noise yields a 0.5 mv. signal out of the second circuit at least for input $e_{02}$ of about 300 mv. or less.

It will be appreciated that when the input signal to the second circuit is so large that substantially the loop gain of the second circuit is unity, the noise signal $e_n$, riding on the large signal passes substantially unattenuated. At high sound levels, this may pose no particular problem inasmuch as the signal to noise ratio is still quite large.

Where high fidelity audio reproduction or transmission is desired, it has been found that low level signals passed through the invention are substantially devoid of noise both of low and high frequency content (i.e. below and above 2 kc.). However, typically the "hiss" or noise in magnitude tapes is mostly of high frequency content and in such instance with the circuit of FIG. 2, high amplitude signals carry a substantially unattenuated high frequency content.

To obviate this problem, the prior art, as previously noted, uses spectrum division with discrete channels for each frequency band. The present invention, on the other hand, allows solution of the problem without introducing any additional conditioning channels. To this end, as shown in FIG. 3 (again like numerals denoting like parts), the network substantially includes all of the elements in the same configuration as those of FIG. 2. However, the first circuit further comprises resistor 68 and capacitor 70 in series with one another, both also being in parallel with resistor 32. Similarly, in parallel with resistor 48 is the series combination of resistor 72 and capacitor 74. Resistors 68 and 72 are the same value as one another as are the capacitances of capacitors 70 and 74. Also, capacitor 76 is provided in series with resistor 52 and diodes 54 and 56 and in parallel with resistor 58. Similarly, capacitor 78, of value equal to capacitor 76, is in series with resistor 60 and diodes 62 and 64, and in parallel with resistor 66. The addition of the capacitors to the input and feedback impedances renders the preconditioning and postconditioning networks of FIG. 3 responsive to frequency while the impedances remain also responsive to the instantaneous voltage value of the signals.

Exemplary circuit values can be as follows in the embodiment shown in FIG. 3:

Resistors 32, 58, 66 and 48—100 KΩ
Resistors 68 and 72—10 KΩ
Resistors 52 and 60—7.5 KΩ
Capacitors 70, 76, 74 and 78—3000 pfd.

In such case it will be seen that the combination of resistors 32, 68 and 70 constituting the input impedance to amplifier 28 presents a high impedance (ca. 100 KΩ) to low frequencies and a low impedance (ca. 9 KΩ) to high frequencies. Similarly, the feedback impedance 30 around amplifier 28 is higher at low frequencies and low at high frequencies.

At the higher frequencies where the capacitors tend to introduce the smaller reactances, the non-linear impedance of the diodes responsive to signal amplitude become effective, while at the lower frequencies, the circuits operate more linearly. Thus, the high frequency noise interactions with high amplitude, low frequency signals is minimized.

In the system of FIG. 2 it is apparent that the non-linear changes in impedance with signal amplitude are substantially continuous functions. The present invention can readily be modified so that the circuit responds linearly with a high slope up to a precise signal amplitude, and with a low slope for signal amplitudes over that value, thereby providing a non-linear response. To this end, as shown in FIG. 4, the feedback loop around amplifier 28 includes means for detecting the signal amplitude from the latter, preferably regardless of polarity, and for comparing the amplitude detected with a reference value. For this purpose, the circuit includes a pair of voltage comparators 80 and 82 each having one input connected to the output of amplifier 28, another input connected to a reference voltage source 83, and having their respective outputs in turn connected to OR gate 84. Typically such comparators can be commercially available devices such as Type 710 from Fairchild Semiconductor Co., Mountain View, Calif., and yield an output signal only when the detected voltage exceeds a precisely preset reference voltage. The output of gate 84, with appropriate amplification (not shown) if necessary, is applied to switching means such as *n*-channel field effect transistor 86, as at gate 88 of the latter. The drain of transistor 80 is connected to summing junction 36 and the source is connected through resistor 90 to the output of amplifier 28. Connected in parallel to transistor 86 and resistor 90 is another resistor 92.

To insure inverse relationship, the input impedance to amplifier 42 in FIG. 4 includes another pair of comparators 94 and 96 connected at their inputs to terminal 40 and at their outputs to OR gate 98. The latter has its output connected to the gate of field effect transistor 100 which has its source and drain respectively connected through resistor 102 to terminal 40 and to junction 46. Resistor 104 directly connects terminal 40 and junction 46.

Obviously, when signals detected by either comparator 80 or 82 exceed the present reference value, the ensuing output is fed through gate 84 and abruptly turns transistor 86 "on," effectively throwing resistor 90 and 92 into parallel with one another and sharply dropping the value of the total feedback impedance, providing a non-linear effect. The inverse non-linear effect provided by operation of the input impedance to amplifier 42 does not depend on matching the continuous response curves of two non-linear devices such as diodes, as in the embodiment of FIG. 2, but instead depends on an arbitrarily chosen, readily reproduced standard, i.e. a reference voltage. Hence, need to match non-linear semiconductors is obviated, and problems arising out of differential ambient temperatures (as might arise where the pre- and post-conditioning circuits are widely separated) are overcome.

Clearly many other types of feedback and input impedance can be used in the invention to achieve signal conditioning, provided that the transfer functions obtained are inversely related.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. A system for conditioning electrical signals transferred through a signal transmission network having input and output terminals, so as to enhance the dynamic range of said network and suppress the effect of noise; said system, comprising in combination:

a first circuit for providing, responsively to at least the instantaneous amplitude of said signals, output signals variable as a non-linear function of said amplitude, said first circuit being connected for applying said output signals to said input terminal of said network, said first circuit being an operational amplifier having input and feedback impedances, at least one of said impedances being variable non-linearly responsively to the amplitude of the signal applied thereto; and a second circuit having an input connected to said output terminal of said network for providing, responsively to the instantaneous amplitude of signals at said output terminal, further output signals variable as the inverse of said non-linear function, said second circuit being an operational amplifier having input and feedback impedances, the input impedance of said second circuit being substantially the same as the feedback impedance of said first circuit, the feedback impedance of said second circuit being substantially the same as the input impedance of said first circuit;

whereby the transfer function of said combination is substantially identical to the transfer function of said network alone.

2. A system for conditioning electrical signals transferred through a signal transmission network having input and output terminals, so as to enhance the dynamic range of said network and suppress the effect of noise; said system, comprising in combination:

a first circuit for providing, responsively to at least the instantaneous amplitude of said signals, output signals variable as a non-linear function of said amplitude, said first circuit being connected for applying said output signals to said input terminal of said network; and a second circuit having an input connected to said input terminal of said network for providing, responsively to the instantaneous amplitude of signals at said output terminal, further output signals variable as the inverse of said non-linear function;

said first and second circuits each being formed of respective high gain inverting amplifier having a summing junction at its input, a feedback impedance connecting the output of the amplifier to said summing junction, and an input impedance connected to said summing junction so that the transfer function of each said circuit is determined substantially by the ratio of its respective feedback impedance to input impedance;

the feedback impedance around the amplifier in said first circuit varying non-linearly with respect to amplitude of signals applied to said first circuit;

the feedback impedance around the amplifier of said second circuit being substantially identical to the input impedance to the amplifier of said first circuit, and the input impedance to the amplifier of said second circuit being substantially identical to the feedback impedance around the amplifier in said first circuit circuit such that the transfer functions of said circuits with respect to signal amplitude are the inverse of one another.

3. A system as defined in claim 2 wherein said feedback impedance around the amplifier in said first circuit includes at least one diode.

4. A system as defined in claim 2 wherein said feedback impedance around the amplifier in said first circuit includes a pair of paralleled, oppositely poled diodes in series with a first resistance and a second resistance in parallel to said diodes and first resistance;

said input impedance to the amplifier of said first circuit including a third resistance.

5. A system as defined in claim 4 wherein said feedback impedance around the amplifier in said first circuit includes a first capacitance in series with said diodes and first resistance and in parallel to said second resistance; and said input impedance to the amplifier of said first circuit includes a fourth resistance in series with a second capacitance, both being in parallel to said third resistance.

6. A system as defined in claim 2 wherein the feedback impedance around the amplifier in said first circuit has a first substantially constant value responsively to signals below a predetermined amplitude and a different substantially constant value responsively to signals above said predetermined amplitudes.

7. A system as defined in claim 6 including means for establishing the value of said predetermined amplitude and for comparing the amplitude of a signal with said value; and means responsive to such comparison for accordingly varying the value of said feedback impedance around the amplifier in said first circuit.

References Cited

UNITED STATES PATENTS

| | | | |
|---|---|---|---|
| 2,156,658 | 5/1939 | Shore | 333—14 |
| 2,410,489 | 11/1946 | Fitch | 325—46 |
| 3,324,422 | 6/1967 | Luna | 333—14 |
| 3,406,357 | 10/1968 | Garcia et al. | 333—14 |

STANLEY D. MILLER, Primary Examiner

U.S. Cl. XR.

307—230, 237; 328—162, 165; 330—110